(12) United States Patent
Skubch

(10) Patent No.: US 11,150,647 B2
(45) Date of Patent: Oct. 19, 2021

(54) CONGESTION AVOIDANCE AND COMMON RESOURCE ACCESS MANAGEMENT FOR MULTIPLE ROBOTS

(71) Applicant: Rapyuta Robotics Co., Ltd, Tokyo (JP)

(72) Inventor: Hendrik Skubch, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 258 days.

(21) Appl. No.: 16/366,444

(22) Filed: Mar. 27, 2019

(65) Prior Publication Data
US 2020/0310415 A1 Oct. 1, 2020

(51) Int. Cl.
G05D 1/00 (2006.01)
B65G 1/137 (2006.01)
G05D 1/02 (2020.01)

(52) U.S. Cl.
CPC ......... G05D 1/0027 (2013.01); B65G 1/1373 (2013.01); G05D 1/0214 (2013.01); G05D 1/0289 (2013.01); G05D 2201/0216 (2013.01)

(58) Field of Classification Search
CPC .. G05D 1/0027; G05D 1/0214; G05D 1/0289; G05D 2201/0216; B65G 1/1373
See application file for complete search history.

(56) References Cited

U.S. PATENT DOCUMENTS 9,904,287 B1* 2/2018 Kuffner, Jr. ........... G06T 19/006
10,513,033 B2* 12/2019 Johnson ................. B25J 9/1666
2012/0065834 A1* 3/2012 Senart .................... G07C 5/008
  701/31.4
2015/0224891 A1* 8/2015 Petrosian .............. B60L 53/305
  701/31.4
2017/0192438 A1* 7/2017 Morimoto .............. G08G 1/161
(Continued)

FOREIGN PATENT DOCUMENTS

JP 2006154907 A 6/2006
JP 2010237924 A 10/2010
JP 2016134019 A 7/2016

OTHER PUBLICATIONS

International Search Report dated Jun. 30, 2020, in the PCT Application No. PCT/IB2020/052906.
(Continued)

Primary Examiner — Tyler J Lee
Assistant Examiner — Yufeng Zhang
(74) Attorney, Agent, or Firm — Trupti P. Joshi

(57) ABSTRACT

Embodiments herein disclose methods and systems to avoid congestion in an area by a plurality of robots awaiting access to a common resource. A current robot action and a sensor data of one of the plurality of robots is received at a cloud node. Based on the received current robot action and the sensor data, a determination is made whether the one of the plurality of robots has to access the common resource. Next, a spatial query is executed at the cloud node to determine a location in the area for positioning the one of the plurality of robots awaiting access to the common resource based on a static spatial condition that requires a congestion-free movement when the robot is positioned at the location in the area. Next, based on a collaboratively determined priority order, the common resource is accessed by the one of the plurality of robots.

21 Claims, 4 Drawing Sheets

(56) References Cited

U.S. PATENT DOCUMENTS

| | | | |
|---|---|---|---|
| 2018/0001903 A1* | 1/2018 | Nagy | B60W 30/09 |
| 2019/0137290 A1* | 5/2019 | Levy | G01C 21/3461 |
| 2019/0275893 A1* | 9/2019 | Sham | B60L 53/31 |

OTHER PUBLICATIONS

Written Opinion dated Jun. 30, 2020, in the PCT Application No. PCT/IB2020/052906.

* cited by examiner

CONGESTION AVOIDANCE AND COMMON RESOURCE ACCESS MANAGEMENT FOR MULTIPLE ROBOTS

TECHNICAL FIELD

The embodiments herein relate to managing robots and, more particularly, to congestion avoidance and common resource access management for multiple robots.

BACKGROUND

Usage of robots in industry has been exponentially increasing. Robots are now being used for both personal use and commercial space. In order to tap the potential of robots, a large number of robots are employed within a particular area, for example, a warehouse floor.

Using multiple robots increases Key Performance Indicator (KPI) for operations being performed in the particular area. For example, using multiple robots within a warehouse increases order fulfillment ratio and decreases waiting time at a warehouse. At several instances, multiple robots may have to use a common resource within the area at the same time, for example, a charging point within a warehouse, or a particular rack within the warehouse that has a high demand object required in multiple orders. These robots waiting for access to the common resource may block the free space, for example pathways, within the area, which is undesirable.

BRIEF DESCRIPTION OF THE FIGURES

The embodiments disclosed herein will be better understood from the following detailed description with reference to the drawings, in which.

DETAILED DESCRIPTION

Figure 1:
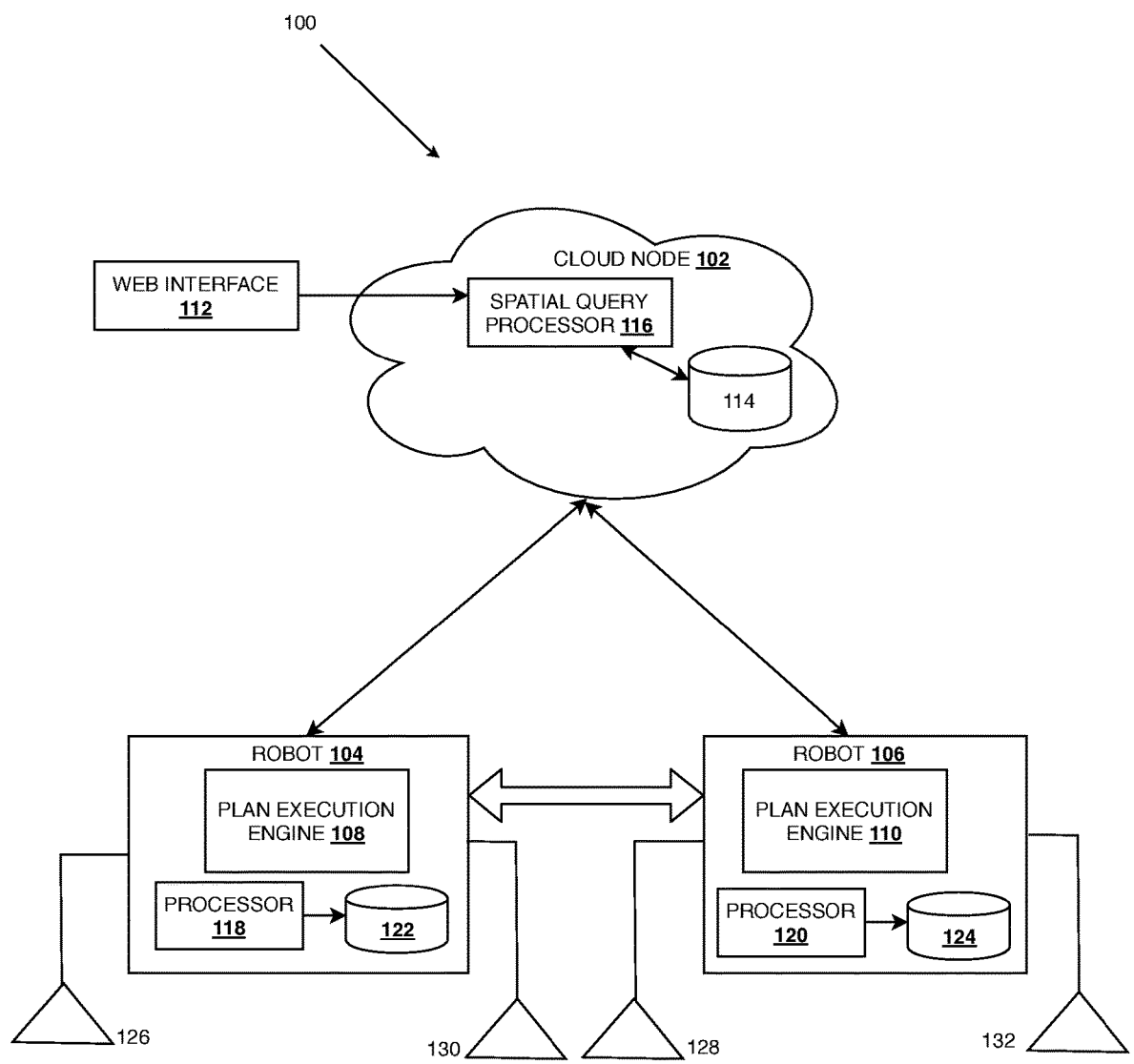
FIG. 1 illustrates an exemplary system to avoid congestion in an area by a plurality of robots awaiting access to a common resource and determining priority order for accessing the common resource, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for congestion avoidance and common resource access management for multiple robots. A congestion occurs when one or more robots block free movement of other robots in the same environment. One of the reasons for congestion may be when multiple robots waiting to access a common resource, for example, a charging point, a particular rack within the warehouse, etc., block pathways of other non-waiting robots.

In order to avoid congestion, the system has to ensure that robots waiting to access a common resource do not occupy the areas that block movement of other robots. In one embodiment, the system uses spatial queries to determine the position of the waiting robots. These spatial queries use spatial data and spatial conditions to ensure that robots are positioned in a location within the area that allows congestion-free movement of robots within the area. The spatial data may include a parking area defined around the common resource where the robots can wait for accessing the common resource.

A spatial query is executed to determine the position of the robots at the parking area. In one embodiment, the spatial query uses static spatial data and dynamic spatial data as input to determine the execution result. A static spatial data may be the spatial data that is pre-determined or received from a user, for example, a pre-defined parking area around the common resource where the different robots waiting to access the common resource and the robot using the common resource are positioned. A dynamic spatial data may be a spatial data that is not predetermined and is obtained during execution of operations by the robots, for example, position of a robot that has broken down. In one embodiment, the determined position of the robots within the parking area is the query result obtained after executing the spatial query.

The spatial query determines the query result using the static and dynamic spatial data based on one or more query conditions. Query conditions are conditions that are to be satisfied by the query result. For example, the query condition for the spatial query may be that "determine a location in the area to position the robots such that the robots in the parking area do not congest the warehouse" or "determine a location in the area to position the robots for a congestion-free movement in the area". Based on the query condition, the spatial query determines position of robots at the parking area (static spatial data) that is not overlapping a position within any of the possible routes, for example, aisles, entrance, exits, etc. of a warehouse (static spatial condition). For example, if the aisles are positioned between (2,3) and (5,3) then the robot location is determined as a point that is not in between these two coordinates.

In one embodiment, after the robots determine a location in the area for positioning the robots at the parking area then the robots collaborate with each other to determine the priority order in which the robots access the common resource. The determination of the priority order in which the robots use the common resource may be done collaboratively by a plan execution engine executing at the robots. A plan execution engine is a software module that includes logic to perform different operations required to control plan execution. For example, the plan execution engine stores the logic to determine the priority order in which the robots access the common resource. The logic may check the task priority of the task being executed by each of the robots, the robot's battery level, etc. to determine the order. Based on the determined priority order, the robot access the common resource.

FIG. 1 illustrates an exemplary system 100 to avoid congestion in an area by a plurality of robots awaiting access to a common resource and determining priority order for accessing the common resource, according to an embodiment. The system 100 includes one or more cloud nodes 102 and robots 104 and 106 executing plan execution engines 108 and 110, respectively. In one embodiment, the robots 104 and 106 are awaiting access to a common resource, for example a charging location, a particular rack within the warehouse, etc.

In one embodiment, the cloud node 102 receives static spatial data related to a particular area including one or more common resources. For example, the cloud node may receive a static map of the warehouse including the alleys within the warehouse, the position of different racks within the warehouse. In one embodiment, a web interface 112 in communication with the cloud node 102 displays the static spatial data, for example a static map, and allows a user to identify one or more common resources within a particular location. The web interface 112 also allows a user to define a parking area around the common resource. The parking area may be defined of any shape, for example, a square, a triangle, a polygon, a circle, etc. In one embodiment, the parking area may be auto-determined such that it can accommodate a particular maximum number of robots. In one embodiment, the static spatial data which may include the static map data, the common resources, and the parking area is stored at a memory 114 of the cloud node 102.

In one embodiment, the web interface 112 also allows a user to define a spatial query that is executed to determine position of the robots within the parking area. In one embodiment, a spatial query is a set of spatial query conditions that forms basis for determining a spatial query result from a spatial database system. The spatial query condition included in the spatial query may be a static spatial query condition or a dynamic spatial query condition. For example, a static spatial query condition may be that the robots are positioned in the parking area such that the robots do not congest the pathways within the location. A dynamic spatial query condition may be, for example, when a broken-down robot is identified within the location then the robots use the area around the broken robot to wait for the common resource or when an obstacle is identified at the parking space then identify another location in the warehouse to position the robots that do not congest the warehouse. The dynamic conditions ensure a congestion-free area in the warehouse when an obstacle or condition is identified in real-time.

In one embodiment, the cloud node 102 includes a spatial query processor 116 that executes the spatial query to determine the query result. In one embodiment, the spatial query result is a set of locations in the area for positioning the different robots that want to access the resource. The spatial query processor 116 uses the static spatial data, for example, the location of the pathways, the location of the parking space, etc., the static spatial query condition, for example the spatial condition that the robots should not congest the pathways, and dynamic spatial query condition, if any, to execute the spatial query and determine the query result. The query result may be the location in the area where the robot is to be positioned when the robot is awaiting access to the common resource.

In one embodiment, the robots 104 and 106 include processors 118, 120 and memory 122,124, respectively. The processors 118 and 120 execute the plan execution engine 108 and 110, respectively. In one embodiment, the plan execution engines 108 and 110 are integrated into a domain specific framework which comprises of other components such as a communication middleware to establish communication between the robots 104 and 106, and sensor and actuator drivers to send and receive data from sensors 126, 128 and actuators 130, 132 of the robots 104 and 106, respectively.

In one embodiment, the robots 104 and 106 communicate wirelessly with the cloud node 102 to transfer the sensor data as dynamic spatial data to the spatial query processor 116 at the cloud node 102. The robots 104 and 106 also receive the query result, which include positions at which the robots are to be positioned in the parking area. The robots 104 and 106 executing the plan execution engines 108 and 110, respectively, communicate with each other via wireless communication. In one embodiment, the plan execution engines 108 and 110 individually determine the priority order for accessing the common resource based on the priority of task being executed by the robots 106 and 108, respectively. The plan execution engines 108 and 110 then exchange the determined priority order with each other to determine any conflict in the determined priority order.

The priority order may also be determined based on other factors, for example, battery remaining, health of the robots, etc. Based on the determined priority, the plan execution engine 108 and 110 sends an instruction to the actuators 130 and 132 of the robots 104 and 106 to access the resource and perform one or actions related to the common resource. For example, the plan execution engine 108 may send an instruction to the actuator 130 to move from a position in the parking space to the charging station and initiate charging of the robot 130. In one embodiment, the priority is again determined for the remaining robots after a robot completes one or more operation related to the common resource.

The present invention therefore solves a technical problem in the field of robot navigation. The present invention provides a mechanism to use spatial queries to easily identify location within the area where the robots may be positioned without congesting the area.

Figure 2:
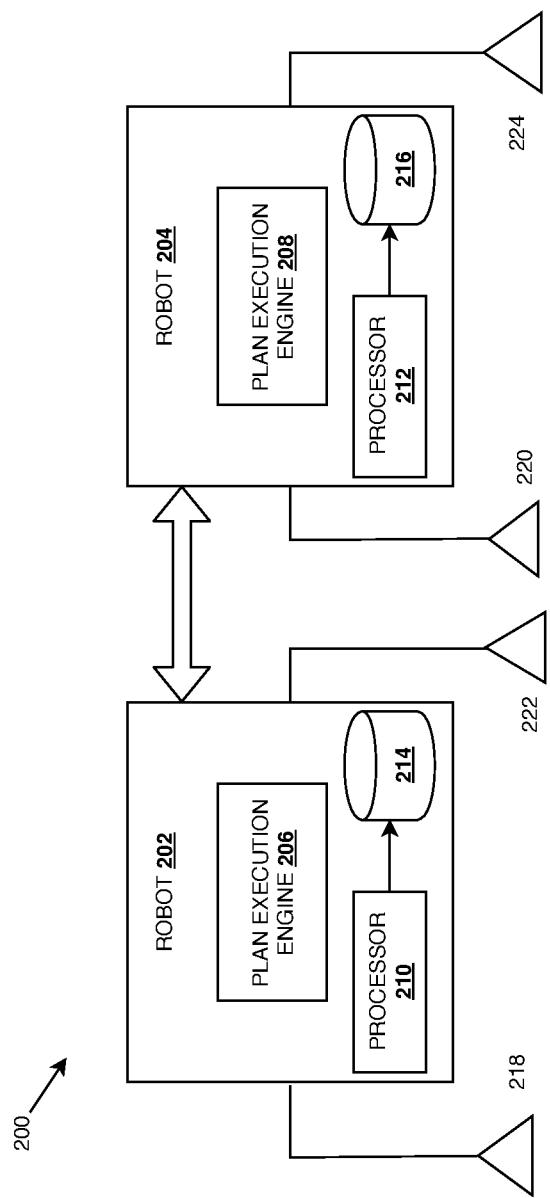
FIG. 2 is a block diagram illustrating another exemplary system to avoid congestion in an area by a plurality of robots awaiting access to a common resource and determining priority order for accessing the common resource, according to an embodiment.

FIG. 2 is a block diagram illustrating another exemplary system 200 to avoid congestion in an area by a plurality of robots awaiting access to a common resource and determining priority order for accessing the common resource, according to an embodiment. In one embodiment, the robots 202 and 204 includes plan execution engines 206 and 208, respectively, which can collaboratively determine the location in the area for positioning the robots 202 and 204 and also determine the priority order for accessing the common resource. In this case, the different static spatial data and the spatial query can be included in an application code executing at the plan execution engines 206 and 208. The plan execution engines 206 and 208 executes the spatial query by a constraint solver included in the plan execution engines 206 and 208, respectively. In one embodiment the robots 202 and 204 include processors 210, 212 and memory 214, 216, respectively. The processors 210 and 212 execute the plan execution engines 206 and 208, respectively. The constraint solver uses the current action being executed by the robots 202 and 204, respectively, and sensor data received from the sensors 218 and 220, respectively to execute the query and determine a location in the area for positioning the robots. For example, the current action of a robot may be to access a rack that is a common resource for several robots. In one embodiment, any resource in the area that is awaiting access from several robots can be identified as a common resource, at runtime. The plan execution engines 206 and 208 also collaboratively determine the priority order for accessing the common resource. Based on the determined priority order, the plan execution engines 206 and 208 send an instruction to actuators 222 and 224 to access the common resource. As the determination of waiting locations and processing priority is being performed locally by plan execution engines 206 and 208 at the robots 202 and 204 it leads to faster decisions. This is helpful specially in case when spatial data is dynamically changing in the area.

Figure 3:
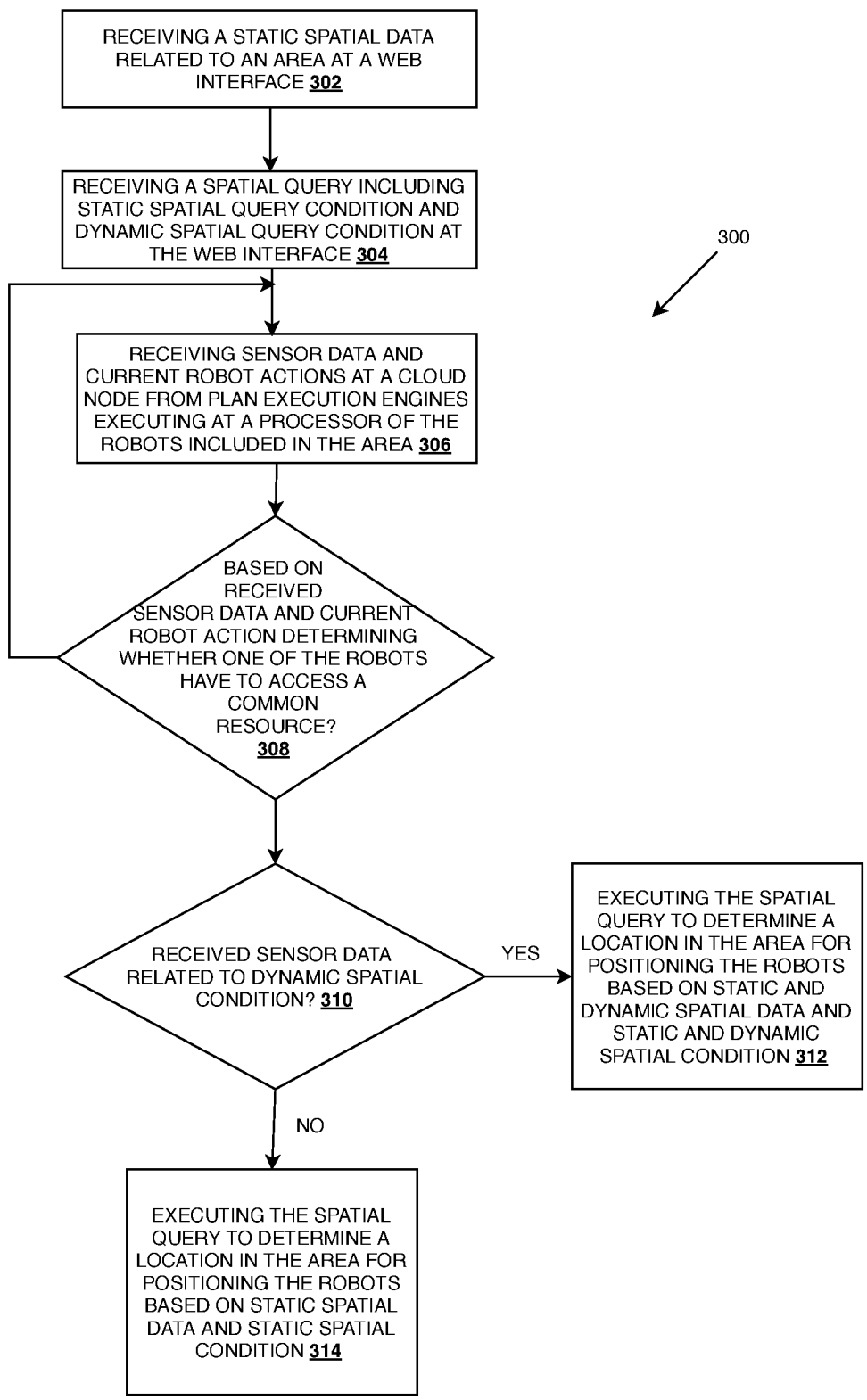
FIG. 3 is a flow diagram illustrating a process to avoid congestion in an area by a plurality of robots awaiting access to a common resource, according to an embodiment.

FIG. 3 is a flow diagram 300 illustrating a process to avoid congestion in an area by a plurality of robots awaiting access to a common resource, according to an embodiment. In one embodiment, initially a static spatial data related to an area is received at a web interface (302). As discussed above, the static spatial data includes a static map of the location, for example, a warehouse floor, a common resource, a parking area around the resource, etc. Next a spatial query including static spatial query condition and dynamic spatial query condition are received at the web interface (304). The spatial query uses the static and dynamic spatial data to determine spatial points for positioning the robots within the parking area that satisfies the static spatial query condition and dynamic spatial query condition.

Next sensor data and current robot action is received at the cloud node from plan execution engines executing at a processor of the plurality of robots at the location (306). The current robot action includes details related to the current actions that robots want to perform, for example, a resource at the location that the robot has to access, for example a particular rack that the robot has to access, or a condition of the robot, for example a battery level lower than a particular threshold. Sensor data from the plurality of robots may also be received at the cloud node. The sensor data may indicate whether a robot breakdown has been captured by a sensor and the coordinates of the robot that has broken down.

Next a check is performed by the spatial query processor at the cloud node, based on the received sensor data and the current robot action, whether one or more robots have to access the common resource (308). In case condition in 308 is true then a check is performed to determine whether the received sensor data is related to a dynamic spatial condition (310). For example, a dynamic spatial condition may be that a robot awaiting access to a common resource may wait around a broken-down robot.

In this case, a sensor data of a robot that sensed a robot that broke down in vicinity matches the dynamic spatial condition. Next in case condition in 310 is true the spatial query is executed to determine the position of the robots awaiting access to the common resource based on the received static and dynamic spatial data and static and dynamic spatial query condition (312).

In one embodiment, the query result are locations in the area where the robots can be positioned such that the robots are within a parking area and satisfies static and dynamic spatial condition. For example, consider that four robots are awaiting access to a charging point and this charging point is near an alley. A parking area has been defined around the charging point that is pentagon in shape. A robot that wants to cross the alley should not be blocked by the robots awaiting to use the charging point. In this case, the location of the robot is determined at the periphery of the pentagon such that the robot does not block the alley. In case the condition in 312 is false then the spatial query is executed to determine the position of the robots awaiting access to the common resource based on the received static spatial data and static spatial query condition (314).

Figure 4:
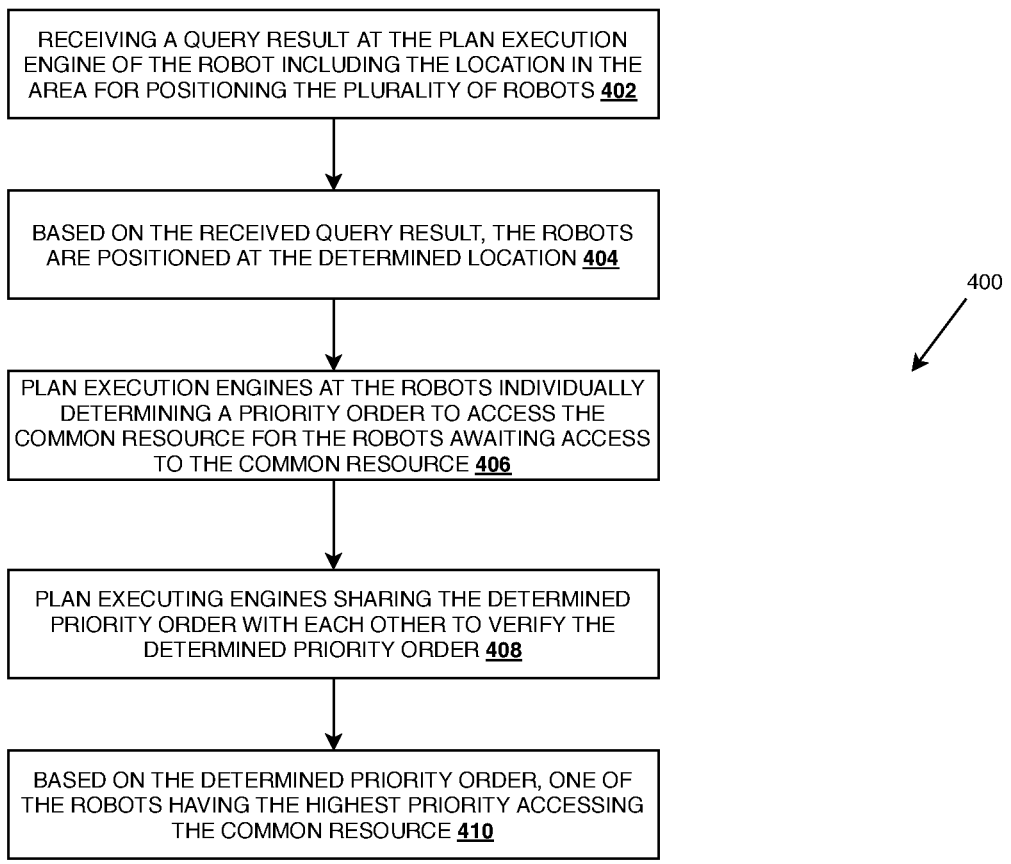
FIG. 4 is a flow diagram illustrating a process to determine a priority-based access to the common resource by the robots awaiting access to the common resource.

FIG. 4 is a flow diagram 400 illustrating a process to determine a priority-based access to the common resource by the robots awaiting access to the common resource, according to an embodiment. In one embodiment, the robots awaiting access to the common resource receive the query result indicating the location in the area where the robots are to be positioned (402). Based on the received position, the robots are positioned at the determined locations (404). Next the plan execution engine at the robots individually determine a priority order to access the common resource for the robots awaiting access to the common resource (406). The robots then share the determined priority with each other to verify the determined priority (408). Finally, based on the determined priority one of the robots having highest priority access the common resource (410).

The embodiment disclosed herein specifies methods and systems for managing robots in a location to minimize congestion caused by the robots. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A computer implemented method to avoid congestion in warehouse by a plurality of robots awaiting a priority-based access to a common resource within the warehouse, the method comprising: receiving a current action and a sensor data of one of the plurality of robots executing operations within the warehouse; determining whether the received sensor data is related to a dynamic spatial condition, wherein the dynamic spatial condition includes condition related to the execution of the operations by the plurality of robots within the warehouse; based on the received current action and the sensor data, determining whether the one of the plurality of robots has to access the common resource; executing a spatial query to determine a location in the warehouse for positioning the one of the plurality of robots awaiting access to the common resource based on a static spatial condition that requires a congestion-free movement in the warehouse when the robot is positioned at the location in the warehouse, wherein the common resource is identified, at runtime, which is awaiting access from the plurality of robots; determining collaboratively, by the plurality of robots, a priority order for accessing the common resource; and based on the determined priority order, accessing the common resource by the one of the plurality of robots, wherein the received sensor data indicates a robot has broken down, wherein the dynamic spatial condition includes: identifying the broken-down robot within the location in the warehouse such that the one of the plurality of robots use the area around the broken robot awaiting access to the common resource.

2. The computer implemented method according to claim 1, wherein executing the spatial query further comprises: executing the spatial query to determine the location for positioning the one of the plurality of robots based on a static spatial data including information related to a parking area defined around the common resource, wherein the parking area, within the warehouse, is defined in the form of a geometric shape that can accommodate the plurality of robots, wherein the static spatial data includes a static map of the warehouse floor.

3. The computer implemented method according to claim 1, further comprising: executing the spatial query to determine the location in the warehouse for positioning the one of the plurality of robots awaiting access to the common resource based on a dynamic spatial data, the static spatial condition, and the dynamic spatial condition, wherein the location is determined at a position on a geometric shape of a parking area, such that the positioning of the one of the plurality of robots at the determined location leads to the congestion-free movement in the warehouse, wherein further the dynamic spatial data is obtained during the execution of the operations within the warehouse.

4. The computer implemented method according to claim 1, further comprising: individually determining priority order includes checking priority of task executed by each of the plurality of robots; sharing the determined priority order with each of the plurality of robots to verify the determined priority order, wherein the verification includes determining any conflict in the determined priority order; and providing the priority-based access to the robot having highest priority, wherein the determination of waiting locations and determining the priority order is performed locally by the plurality of robots if the spatial data changes dynamically.

5. The computer implemented method according to claim 1, further comprising: receiving inputs related to the common resource and a parking area within the warehouse; determining automatically a geometric shape for the parking area to accommodate the plurality of robots executing operations within the warehouse; based on the dynamic spatial condition related to an obstacle at the parking area within the warehouse, determining the location, around the obstacle to wait for the common resource or which is different from a location of the obstacle at the parking area, to provide the congestion-free movement in the warehouse.

6. The computer implemented method according to claim 3, further comprising: positioning of the one of the plurality of robots at the determined location includes the other robots of the plurality of robots are not blocked from executing the operations within the warehouse.

7. A system for managing plurality of robots executing operations within a warehouse, comprising: a memory storing instructions; and a processor in communication with the memory executing the instructions to: receive a sensor data of one of the plurality of robots; determine whether the received sensor data is related to a dynamic spatial condition, wherein the dynamic spatial condition includes condition related to the execution of the operations by the plurality of robots within the warehouse; based on a robot action and the sensor data, determine whether the one of the plurality of robots has to access the common resource; execute a spatial query to determine a location in the warehouse for positioning the one of the plurality of robots awaiting a priority-based access to a common resource based on a static spatial condition that requires a congestion-free movement in the warehouse when the robot is positioned at the location in the warehouse, wherein the common resource is identified, at runtime, which is awaiting access from the plurality of robots; determine collaboratively, by the plurality of robots, a priority order for accessing the common resource; and based on the determined priority order, access the common resource, wherein the received sensor data indicates a robot has broken down, wherein the dynamic spatial condition includes: identifying the broken-down robot within the location in the warehouse such that the one of the plurality of robots use the area around the broken robot awaiting access to the common resource.

8. The system of claim 7, wherein the processor further executes the instructions to: execute the spatial query to determine the location for positioning the one of the plurality of robots based on a static spatial data including information related to a parking area defined around the common resource, wherein the parking area, within the warehouse, is defined in the form of a geometric shape that can accommodate the plurality of robots, wherein the static spatial data includes a static map of the warehouse floor.

9. The system of claim 7, wherein the processor further executes the instructions to: execute the spatial query to determine the location in the warehouse for positioning the one of the plurality of robots awaiting access to the common resource based on a dynamic spatial data, the static spatial condition, and the dynamic spatial condition, wherein the location is determined at a position on a geometric shape of a parking area, such that the positioning of the one of the plurality of robots at the determined location leads to the congestion-free movement in the warehouse, wherein further the dynamic spatial data is obtained during the execution of the operations within the warehouse.

10. The system of claim 9, wherein the processor further executes the instructions to: determine priority order includes checking priority of task executed by each of the plurality of robots; share the determined priority order with a priority determined by another robot of the plurality of robots; and access the common resource in the warehouse based on the determined priority order.

11. A non-transitory computer readable medium encoded with instructions that when executed by one or more processors causes the one or more processors to: receive a sensor data of one of a plurality of robots executing operations within a warehouse; determine whether the received sensor data is related to a dynamic spatial condition, wherein the dynamic spatial condition includes condition related to the execution of the operations by the plurality of robots within the warehouse; based on a robot action and the sensor data, determine whether the one of the plurality of robots has to access common resource; execute a spatial query to determine a location for positioning the one of the plurality of robots awaiting priority-based access to the common resource based on a static spatial condition that requires a congestion-free movement when the robot is positioned at the location in the warehouse, wherein the common resource is identified, at runtime, which is awaiting access from the plurality of robots; determine collaboratively a priority order for accessing the common resource; and based on the determined priority order, access the common resource by the one of the plurality of robots, wherein the received sensor data indicates a robot has broken down, wherein the dynamic spatial condition includes: identify the broken-down robot within the location in the warehouse such that the one of the plurality of robots use the area around the broken robot awaiting access to the common resource.

12. The non-transitory computer readable medium according to claim 11, further including instructions which when executed by the one or more processors causes the one or more processors to: execute the spatial query to determine the location for positioning the one of the plurality of robots based on a static spatial data including information related to a parking area defined around the common resource, wherein the parking area, within the warehouse, is defined in the form of a geometric shape that can accommodate the plurality of robots, wherein the static spatial data includes a static map of the warehouse floor.

13. The non-transitory computer readable medium according to claim 11, further including instructions which when executed by the one or more processors causes the one or more processors to: execute the spatial query to determine the location in the warehouse for positioning the one of the plurality of robots awaiting access to the common resource based on the dynamic spatial data, the static spatial condition, and the dynamic spatial condition, wherein the location is determined at a position on a geometric shape of a parking area, such that the positioning of the one of the plurality of robots at the determined location leads to the congestion-free movement in the warehouse, wherein further the dynamic spatial data is obtained during the execution of the operations within the warehouse.

14. The non-transitory computer readable medium according to claim 11, further including instructions which when executed by the one or more processors causes the one or more processors to: determine priority order includes checking priority of task executed by each of the plurality of robots; share the determined priority order with a priority determined by an another robot of the plurality of robots; and access the common resource in the warehouse based on the determined priority order.

15. The non-transitory computer readable medium according to claim 11, further including instructions which when executed by the one or more processors causes the one or more processors to: receive inputs related to the common resource and a parking area within the warehouse; determine automatically a geometric shape for the parking area to accommodate the plurality of robots executing operations within the warehouse; and based on the dynamic spatial condition related to an obstacle at the parking area within the warehouse, determine the location, around the obstacle to wait for the common resource or which is different from a location of the obstacle at the parking area, to provide the congestion-free movement in the warehouse.

16. The non-transitory computer readable medium according to claim 13, further including instructions which when executed by the one or more processors causes the one or more processors to: position the one of the plurality of robots at the determined location includes the other robots of the plurality of robots are not blocked from executing the operations within the warehouse.

17. The non-transitory computer readable medium according to claim 11, further including instructions which when executed by the one or more processors causes the one or more processors to: individually determine the priority order for accessing the common resource; share the determined priority order with a priority determined by another robot of the plurality of robots; determine any conflict in the determined priority order; and provide the priority-based access to the robot having highest priority, wherein the determination of waiting locations and determining the priority order is performed locally by the plurality of robots if the spatial data changes dynamically; and access the common resource based on the determined priority order.

18. A computer implemented method to avoid congestion in a warehouse by a plurality of robots awaiting a priority-based access to a common resource within the warehouse, the method comprising: receiving a current action and a sensor data of one of the plurality of robots executing operations within the warehouse; determining whether the received sensor data is related to a dynamic spatial condition, wherein the dynamic spatial condition includes condition related to the execution of the operations by the plurality of robots within the warehouse; based on the received current action and the sensor data, determining whether the one of the plurality of robots has to access the common resource; executing a spatial query to determine a plurality of locations in the warehouse for positioning the one of the plurality of robots awaiting access to the common resource based on a static spatial condition that requires a congestion-free movement in the warehouse when the one of the plurality of robots is positioned at the one of the plurality of locations in the warehouse, wherein determining the plurality of locations includes determining, individually, by the plurality of robots, the plurality of locations and a priority order, if spatial data changes dynamically; sharing the determined priority order with each of the plurality of robots to verify the determined priority order; providing priority-based access to a robot having a highest priority, and based on the determined priority order, accessing the common resource by the robot, wherein the received sensor data indicates a robot has broken down, wherein the dynamic spatial condition includes: identifying the broken-down robot within the location in the warehouse such that the one of the plurality of robots use the area around the broken robot awaiting access to the common resource.

19. The computer implemented method according to claim 18, wherein executing the spatial query further comprises: defining a parking area, within the warehouse, in the form of a geometric shape that can accommodate the plurality of robots.

20. The computer implemented method according to claim 18, further comprising: based on the dynamic spatial condition related to an obstacle at a parking area within the warehouse, determining the location, around the obstacle to wait for the common resource or which is different from a location of the obstacle at the parking area, to provide the congestion-free movement in the warehouse.

21. The computer implemented method according to claim 18, further comprising: positioning of the one of the plurality of robots at the determined location includes the other robots of the plurality of robots are not blocked from executing the operations within the warehouse.

\* \* \* \* \*